Nov. 25, 1958            G. A. WORN            2,861,873
APPARATUS FOR EFFECTING CATALYTIC EXOTHERMIC REACTIONS
Filed Dec. 7, 1955
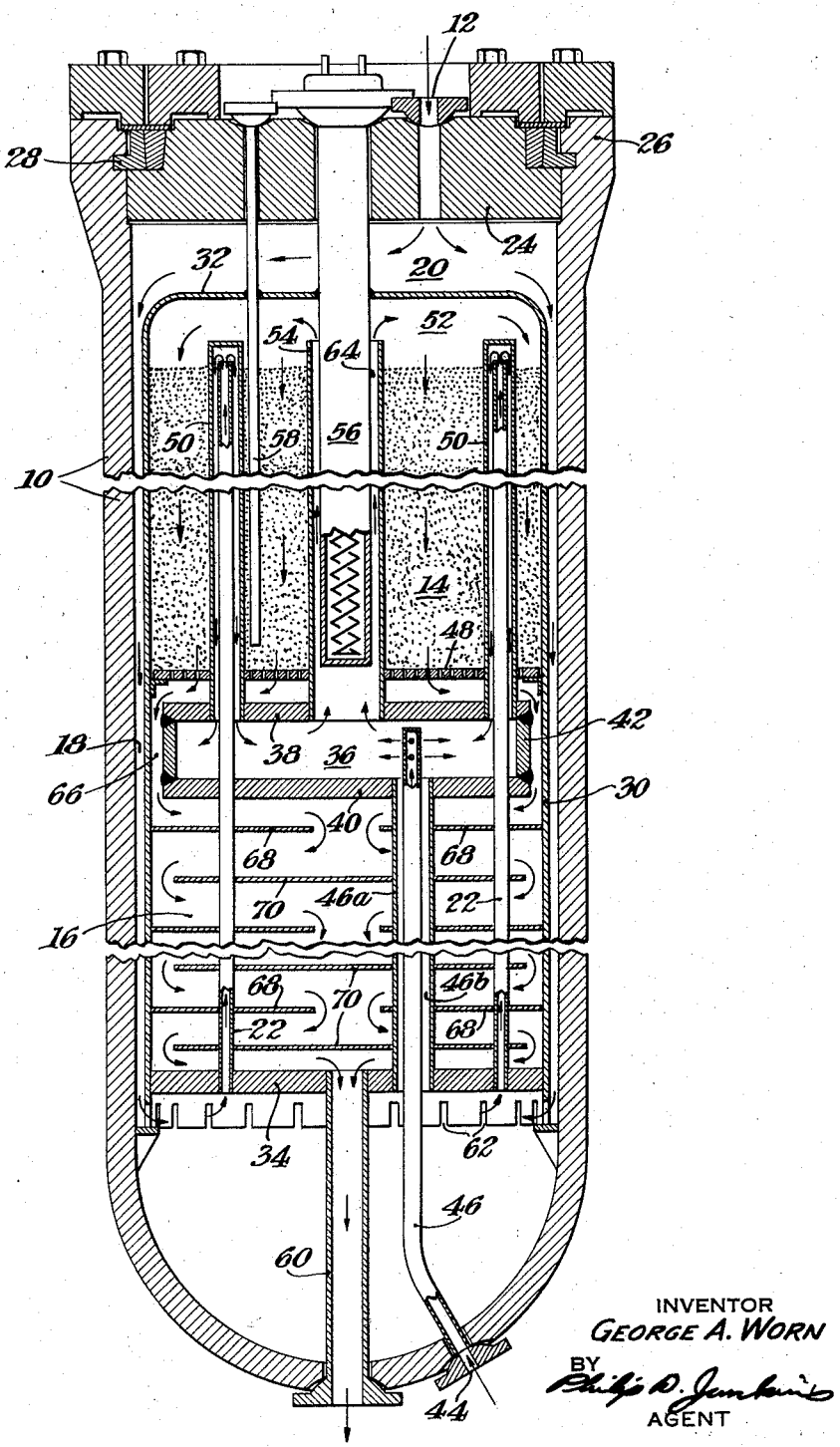
INVENTOR
GEORGE A. WORN
BY
AGENT · # United States Patent Office 2,861,873
Patented Nov. 25, 1958

2,861,873

APPARATUS FOR EFFECTING CATALYTIC EXOTHERMIC REACTIONS

George A. Worn, Greenwich, Conn., assignor to The Lummus Company, New York, N. Y., a corporation of Delaware Application December 7, 1955, Serial No. 551,703

2 Claims. (Cl. 23—289)

This invention relates to apparatus for carrying out high temperature exothermic gas reactions and more particularly refers to improvements in apparatus for the synthetic production of ammonia and chemical reactions of like character.

In the synthesis of ammonia the combined nitrogen and hydrogen gases are compressed to an elevated pressure, heated to a suitable temperature ranging from 400° to 600° C. and passed over a suitable catalytic agent whereby a certain proportion of the combined gases is converted into ammonia. The pressure of the nitrogen-hydrogen gases in contact with the catalyst is constant or as nearly so as possible.

In commercial operations many difficulties are encountered in maintaining the catalyst at an optimum temperature after being initially heated from within and variations of such temperature in either direction lowers the conversion efficiency of the catalyst with decreased yields. It has been found that too low temperatures greatly decrease the activity of the catalyst, so that cooling takes place below that required to maintain the reaction, and therefore production of ammonia ceases entirely. Furthermore, it has been found that the portion of catalyst which first comes in contact with the gas mixture where the activity is more intense, may become injured by overheating or even poisoned by impurities in the gases. Even though such heat may be removed by suitable cooling surfaces surrounding that portion of the catalyst, yet local overheating is likely to occur in the form of hot spots in the catalyst mass.

Heretofore removal of the heat of reaction has been accomplished throughout the catalyst by the use of heat transfer surfaces suitably disposed within the catalyst mass, but such system of control inevitably permits great difference in temperature in various parts of the catalyst mass and allows no adequate control of temperatures capable of being varied with operating conditions to secure optimum temperatures for maximum conversion.

It is an object of my invention to provide for better control of the temperatures developed during exothermic catalytic reactions whereby the heat evolved in the catalyst mass is prevented from substantial variation.

A further object of my invention is to provide an improved catalytic reactor for carrying out high temperature exothermic reactions wherein substantial construction economies can be realized as well as ease of maintenance and repair.

Other objects of my invention will be apparent from the accompanying drawing and the following description of the features of the invention and in the provision of apparatus and methods of operation for accomplishing the foregoing objects.

In the drawing, the figure illustrates schematically a vertical section of a converter adapted for carrying out my invention.

The converter comprises an outer shell 10, provided with a main gas inlet 12, the shell enclosing a catalyst bed 14 and a preheating zone 16, both spaced from the outer shell by an annular passageway 18, extending from a gas receiving chamber 20 at the top of the converter to the lower portion of said preheating zone. The preheating zone is equipped with heat exchange tubes 22. The shell 10 is provided with a closure 24 at the top to provide access to the catalyst bed and associated apparatus and, as illustrated, the entire internal structure of the converter may be removed upwardly through open end 26 of the shell for inspection and maintenance purposes. During process operation the closure 24 is locked into sealed relation with the shell. As illustrated in the drawing, the sealed relation may be accomplished by shear ring 28 and associated retaining rings and gaskets as disclosed in Gertzon Patent 2,268,507, however, any form of sealing arrangement for making a fluid tight high pressure joint between the cover and shell may be used.

The catalyst bed 14 and preheating zone are contained within a cylindrical shell 30 set within the converter vessel and having an integral top 32 and bottom plate 34 strong enough to withstand pressures employed during process operation. The bottom plate 34 forms a tube sheet for tubes 22 and is of substantial thickness whereby such tubes may be adequately affixed thereto. A chamber or header 36 formed by tube sheets 38 and 40 and annular wall 42 is located above preheating zone 16 and forms a manifold area wherein regulated quantities of cold by-pass gas entering through inlet 44 and tube 46 can mix with preheated reactant gas to control the temperature of such gases just prior to their passage through the catalyst bed. Surrounding pipe 46 is a tube 46a which extends from tube sheet 34 to tube sheet 40 and forms annular space 46b. During assembly or disassembly of the reactor the inner shell 30 and associated apparatus including pipe 46a is free from fixed connection with pipe 46. Also, the relationship of tube 46 and pipe 46a forms an insulating barrier 46b between such tube and pipe. Above tube sheet 38 is a perforated plate 48 which supports catalyst bed 14. The catalyst of the bed 14 is packed around a plurality of pipes 50 each of which surrounds the upper end of one of the tubes 22, passes through plate 48 and is affixed to tube sheet 38 at its lower end. Extending through the center of the catalyst bed from chamber 36 to a space 52 above the bed is pipe 54. Within pipe 54 is an electric heating unit 56 which provides heat to start the gases reacting but which may also supply final heat to the reactant gas mixture just prior to its contact with the catalyst. Pipes 58 extend through closure 24, the top 32 of shell 30 and into the catalyst bed at several points and contain thermocouples for detecting hot spots which may develop in the bed. Control means (not shown) respond to the temperature condition of the catalyst bed as detected by the thermocouples and regulate the main flow of cold reactant gases and by-pass gas flow as well as the heat delivered to the mixed gases by heater 56. Pipe 60 provides an outlet for the cooled products of reaction. As illustrated in the accompanying drawing, outlet pipe 60 is centrally located at the bottom of shell 10. The position of this pipe may, however, be interchanged with that of bypass inlet 44 in order to provide a central point of distribution of cold bypass gas within chamber 36.

In operation, the cold gases to be reacted, entering through main inlet 12 under positive pressure, pass into chamber 20 at the top of the converter and thence pass through annular space 18 between outer shell 10 and inner shell 30, and the slots 62 at the bottom of shell 30 to the lower end of tubes 22. The cold gases pass upwardly through tubes 22 which are surrounded by hot reaction gases passing downwardly in serpentine flow through zone 16. The entering gases to be reacted are heated and the exit gases simultaneously cooled. The preheated gases then continue upwardly through the upper end of tubes 22 which are individually telescoped within pipes 50. The upper end of each of these pipes is closed with the lower end opening into chamber 36. Preheated gases issuing from the upper end of tubes 22 are redirected by closed pipes 50 whereby they flow downwardly around the walls of the inner tubes 22 and thence to manifold chamber 36. These gases then pass upwardly through the central pipe 54 within the interior of the catalyst bed 14. Thus the partially preheated entering gases to be reacted are brought into heat exchanging relation with the catalyst, but are out of contact with the catalyst. Final heating of the gases, if necessary, is accomplished by heater 56 as they pass in close contact with the heater in annular space 64. The gases leaving the top of pipe 54 are distributed throughout space 52 above the catalyst bed 14 and then pass downwardly into actual contact with catalyst and there react exothermically, part of the heat of reaction being adsorbed by the gases in pipes 50. Reacted gases leaving the lower portion of the catalyst bed pass through perforated plate 48 and across tube sheet 38 to the annular space 66 formed between shell 30 and annular wall 42 and thence pass between the portion of tubes 22 in the preheating zone as directed by baffles 68 and 70. Reactant gases, cooled by indirect heat exchange with gases in tubes 22, leave preheating zone 16 and the reactor shell 10 through the outlet pipe 60.

During the progression of the gases to be reacted, as they pass through the preheating zone, pipes 50 and pipe 54, the temperature of such gases is progressively raised so that as they emerge from pipe 54 and enter the chamber 52 at the top of the catalyst bed, they are at about the lower limit of the reaction temperature range. Upon contact with the catalyst, reaction takes place immediately and with considerable evolution of heat. By passing the preheated gases in tubes 22 directly to the top of the bed and thence downwardly through pipes 50 in concurrent flow heat exchange relation with gas flow through the catalyst, more effective cooling of the extremely hot top area of the catalyst bed is accomplished.

In cooling the catalyst bed 14, gases flowing downwardly in pipes 50 may become overheated and according to my invention, supplementary cold or partially heated gases to be reacted may be introduced through inlet 44 and pipe 46 to manifold area 36 and therein join and cool the gases from pipes 50 for passage to the top of the catalyst bed. By appropriate control of the supplementary cold gases the temperature most favorable for efficient reaction is maintained and damage to the catalyst by overheating as well as lower efficiency of conversion is avoided. Additional temperature regulation is afforded by heater 56 which also acts to supply all initial heat to the gases to react during starting up periods.

Extremely flexible temperature regulation is afforded by the gas issuing from tube 46 permitting immediate variation with varying operating conditions as this supplemental gas may be introduced at any desired temperature, and a change may be made at any desired moment by manual control or by control responsive to thermocouples within pipes 58. Thus a desired temperature control can be effected immediately without the addition of added sets of cooling tubes positioned in the catalyst bed.

By introducing cold "quenching" gases into manifold 36, such gases become thoroughly mixed with the hot gases issuing from pipes 50 before reaching the top of the catalyst bed and thereby harmful local undercooling or channelling of gases at differing temperatures is avoided in the catalyst bed.

The present arrangement of gas flow and provision for admission of supplemental gases not only provides improved control of the reaction in such converters, but also permits extensive saving in materials and construction economies such as by eliminating tubes formally necessary in the catalyst bed to cool such bed and the elimination of several additional heavy tube sheets as required in previous converter designs.

While I have shown and described a preferred form of embodiment of my invention, I am aware that modifications may be made thereto and I therefore, desire broad interpretation of my invention within the scope and spirit of the description herein and of the claims appended hereinafter.

I claim:

1. Apparatus for effecting catalytic exothermic gaseous reactions, which comprises an outer shell, an inner shell mounted within said outer shell and spaced from the wall of said outer shell to leave an annular space therebetween, a shell and tube type heat exchanger mounted in the bottom of said inner shell, said annular space communicating with the lower end of tubes of said exchanger, a receptacle containing a catalyst bed mounted in said inner shell and positioned above said exchanger, the upper end of the tubes of said exchanger extending substantially through said catalyst bed, closed end tubes of greater diameter than said exchanger tubes embedded in said catalyst bed and enclosing the upper end of said exchanger tubes whereby an annular passage in communication with said exchanger tubes is formed between said exchanger tubes and said closed end tubes, means for feeding a first stream of reactant gases to be preheated into said annular space and thence through said exchanger tubes and said annular passages, a reactant header communicating with said closed end tubes for receiving preheated reactant gases flowing therefrom, said header being positioned within said inner shell and between said exchanger and said catalyst receptacle, means for feeding a second stream of reactant gases to said header for mixing with and cooling said preheated gases, means for feeding said mixed reactant gases to said catalyst bed for reaction therein, and means for withdrawing reacted gases leaving said catalyst bed through the shell side of said exchanger whereby said first stream of reactant gases is partially preheated and said reacted gases are cooled.

2. Apparatus for effecting catalytic exothermic gaseous reactions, which comprises an outer shell, an inner shell mounted within said outer shell and spaced from the wall of said outer shell to leave an annular space therebetween, a shell and tube type heat exchanger mounted in the bottom of said inner shell, said annular space communicating with the lower end of tubes of said exchanger, a receptacle containing a catalyst bed mounted in said inner shell and positioned above said exchanger, the upper end of the tubes of said exchanger extending substantially through said catalyst bed, closed end tubes of greater diameter than said exchanger tubes embedded in said catalyst bed and enclosing the upper end of said exchanger tubes whereby an annular passage in communication with said exchanger tubes is formed between said exchanger tubes and said closed end tubes, means for feeding a first stream of reactant gases to be preheated into said annular space and thence through said exchanger tubes and said annular passages, a reactant header communicating with said closed end tubes for receiving preheated reactant gases flowing therefrom, said header being positioned within said inner shell and between said exchanger and said catalyst receptacle, means for feeding a second stream of reactant gases to said header for mixing with and cooling said preheated gases, means for feeding said mixed reactant gases to the top of said catalyst bed for reaction in the presence of said catalyst during passage downwardly therethrough, and means for withdrawing reacted gases leaving the bottom of said catalyst bed through the shell side of said exchanger whereby said first stream of reactant gases is partially preheated and said reacted gases are cooled.

References Cited in the file of this patent

UNITED STATES PATENTS

| | | |
|---|---|---|
| 1,478,550 | Casale | Dec. 25, 1923 |
| 1,707,417 | Richardson | Apr. 2, 1929 |
| 1,839,738 | Casale | Jan. 5, 1932 |
| 1,884,880 | Saunders | Oct. 25, 1932 |
| 1,909,378 | Richardson | May 16, 1933 |

OTHER REFERENCES

"Chem. Eng. Process," August 1953, page 394.